(12) United States Patent
Karguth et al.

(10) Patent No.: US 9,669,542 B2
(45) Date of Patent: Jun. 6, 2017

(54) TRANSMISSION MECHANISM

(75) Inventors: Andreas Karguth, Tuttleben (DE); Olaf Mollenhauer, Ilmenau (DE)

(73) Assignee: TETRA GESELLSCHAFT FUR SENSORIK, ROBOTIK UND AUTOMATION MBH (DE)

(*) Notice: Subject to any disclaimer, the term of this patent is extended or adjusted under 35 U.S.C. 154(b) by 967 days.

(21) Appl. No.: 13/143,090

(22) PCT Filed: Jan. 8, 2010

(86) PCT No.: PCT/EP2010/050170
§ 371 (c)(1),
(2), (4) Date: Jul. 1, 2011

(87) PCT Pub. No.: WO2010/081772
PCT Pub. Date: Jul. 22, 2010

(65) Prior Publication Data
US 2011/0266508 A1   Nov. 3, 2011

(30) Foreign Application Priority Data
Jan. 14, 2009 (DE) .................. 10 2009 000 261

(51) Int. Cl.
*B25J 9/00* (2006.01)
*B25J 9/10* (2006.01)

(52) U.S. Cl.
CPC .................. *B25J 9/1045* (2013.01)

(58) Field of Classification Search
CPC ... F16H 19/06; F16H 7/08; B25J 9/104; B25J 9/1045
USPC ......... 74/89.2, 89.21, 89.22, 490.01, 490.04; 474/101, 117, 148, 150; 901/19, 21
See application file for complete search history.

(56) References Cited

U.S. PATENT DOCUMENTS

| 2,212,823 | A | * | 8/1940 | Bulk ........................ 74/501.5 R |
| 3,948,114 | A | * | 4/1976 | Koinzan ................. F16G 13/06 474/101 |
| 4,503,722 | A | * | 3/1985 | Suzuki et al. .................... 74/96 |
| 4,637,773 | A | * | 1/1987 | Nakashima et al. .......... 414/732 |

(Continued)

FOREIGN PATENT DOCUMENTS

| DE | 102 55 950 | 6/2004 |
| DE | 10 2006 016958 | 10/2007 |

OTHER PUBLICATIONS

Tetra Gesellschaft fUr Sensorik, Robotik 14-16,18 und Automation mbH: "BioRob, der klUgere Roboter gibt nach" [Online] May 5, 2008 (May 5, 2008), pp. 1-18, Robotics Products Retrieved from the Internet: URL:http://www.tetra-ilmenau.de/downloads/TETRA%20Bi oRob%20Projektinfo%205_2008. 24.pdf.

(Continued)

*Primary Examiner* — Victor MacArthur
(74) *Attorney, Agent, or Firm* — Mark D. Wieczorek; Stuart H. Mayer; Mayer & Williams PC

(57) ABSTRACT

The invention relates to a transmission mechanism for a drive system, having at least one tensioning device and acting in two directions. For force transmission, the tractive device runs between a drive roll and an output roll, which are carried by a frame. A spring coupling is connected in the force transmission section between the drive roll and the output roll and has a nonlinear force-distance characteristic curve.

5 Claims, 3 Drawing Sheets

(56) References Cited

U.S. PATENT DOCUMENTS

| | | | | |
|---|---|---|---|---|
| 4,986,723 A | * | 1/1991 | Maeda | B25J 9/06 |
| | | | | 294/111 |
| 5,224,722 A | * | 7/1993 | Kempf | 280/166 |
| 5,338,264 A | * | 8/1994 | Kempf | 474/168 |
| 5,778,730 A | * | 7/1998 | Solomon et al. | 74/490.04 |
| 6,280,358 B1 | * | 8/2001 | Hormann | 474/68 |
| 8,607,659 B2 | * | 12/2013 | Zhang | 74/490.04 |
| 8,833,827 B2 | * | 9/2014 | Ciocarlie et al. | 294/111 |
| 2005/0050977 A1 | * | 3/2005 | Kent | B25J 9/107 |
| | | | | 74/490.06 |
| 2008/0063504 A1 | * | 3/2008 | Kroetz | B25J 9/0012 |
| | | | | 414/732 |
| 2008/0273956 A1 | * | 11/2008 | Morris et al. | 414/540 |
| 2011/0040408 A1 | * | 2/2011 | De La Rosa Tames | |
| | | | | B25J 9/1045 |
| | | | | 700/258 |

OTHER PUBLICATIONS

Filippini R et al: "A Compatative Dependability Analysis of Antagonistic Actuation Arrangements for Enhanced Robotic Safety" A 2007 IEEE International Conference on Robotics and Automation—Apr. 10-14, 2007—Roma, Italy, IEEE, Piscataway, NJ, USA, Apr. 10, 2007 (Apr. 10, 2007), pp. 4349-4354.

* cited by examiner

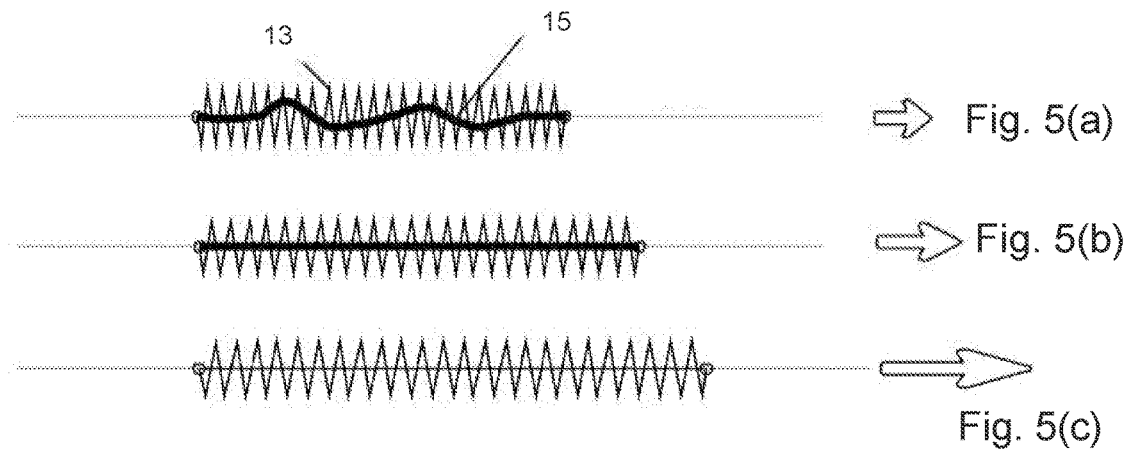
⇒ Fig. 5(a)
⇒ Fig. 5(b)
⇒ Fig. 5(c)
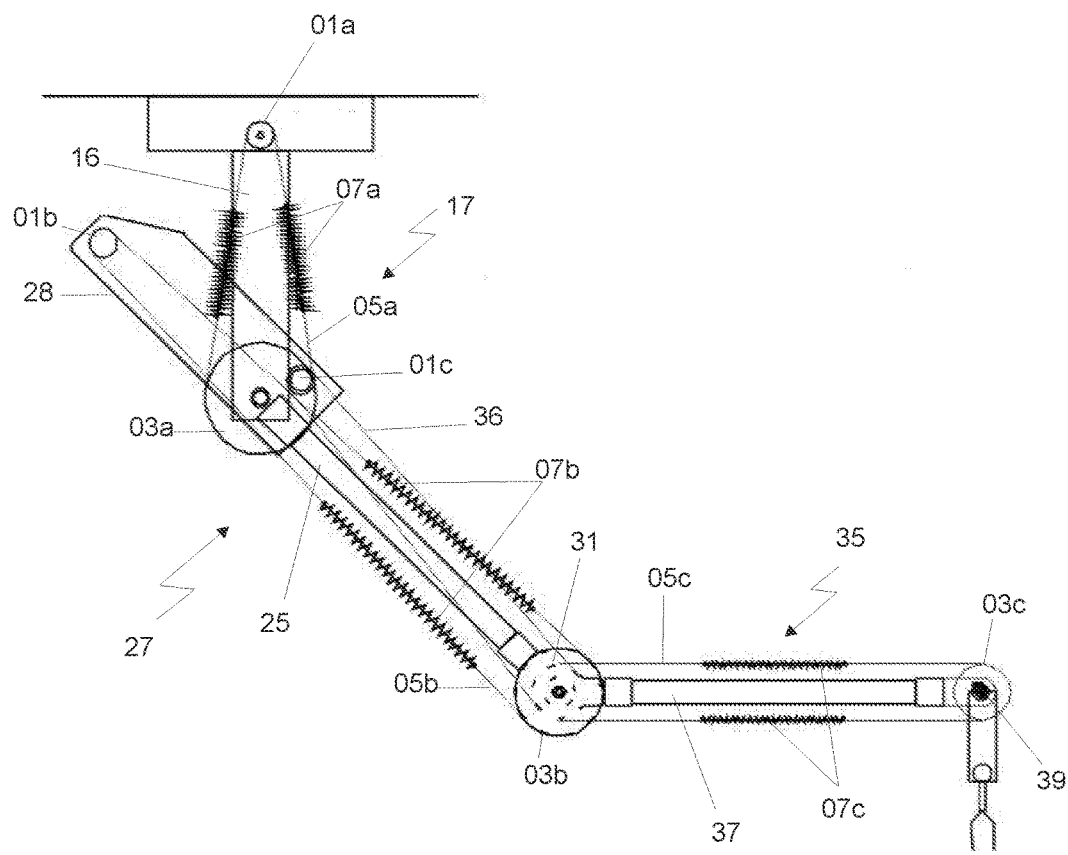
Fig. 7

TRANSMISSION MECHANISM

FIELD OF THE INVENTION

The invention relates to an antagonistically operating transmission mechanism which is adjustable in at least two directions of motion. The transmission mechanism includes at least one traction means for force transmission between a driving roller and a driven roller, where said traction means has a spring coupling in the force transmission section.

BACKGROUND OF THE INVENTION

Transmission mechanisms are used for applications in automation and robotics. In this context, apart from a low mass of the transmission mechanisms, the speed and force of the force transmission are also important. High precision of the output of such transmission mechanisms is particularly important for positioning purposes. In this context, the design and development of lightweight movement mechanisms is often motivated by the structural design of movement mechanisms related to biological applications.

DE 689 21 623 T2 discloses an adjustment element with an inflatable chamber and a tensile fiber. This is not driven by a traction rope, however, but by inflating and/or emptying a component of the chamber. For this purpose, the fiber extends along a wall of the chamber component and is embedded therein, while a further wall of the chamber component is essentially inextensible. During the elongation of the chamber component, the combined length of the chamber component and the connecting link is reduced.

DE 197 19 931 A1 describes a device for compensating vibrations in a swiveling arm of a robot, where any vibrations that occur are attenuated by means of tension springs, a measuring device, and by generating controlled antagonistic forces of the semi-rotary actuator.

In lightweight construction, antagonistically operating belt and chain drives are used for the transmission of motion and power across larger distances. A disadvantage of using elastic traction means is that when the driving side (part of the rope which is pulled and is tight) is under tension, the slack side (part of the rope which is not pulled) sags. The consequence is that the sagging of the slack side during load changes produces considerable problems, especially with respect to the positioning accuracy and positioning speed. A further disadvantage of elastic traction means is that the force which can be transmitted is limited when tension springs are installed in transmission mechanisms.

SUMMARY OF THE INVENTION

The object of the invention is therefore to provide a transmission mechanism for drives to avoid the disadvantages of known belt and chain drives. The intention is particularly to increase the forces which can be transmitted as well as to improve the positioning accuracy.

Ultimately, the aim is increased operational reliability which at the same time also serves to prevent any risks in the event of potential collisions with a mechanical component that is connected on the output side.

The transmission mechanism as taught by the invention facilitates the motion of a driven element in at least two directions of motion by exerting and transmitting a force. The transmission mechanism as taught by the invention is preferably part of a drive system for applications in a robot arm. This drive system consists of a motor, a driving roller and a driven roller as well as preferably a rope-like traction means which runs between the driving roller and the driven roller in order to transmit the force. The force transmission section between the driving roller and the driven roller has a spring coupling which represents a nonlinear load displacement curve.

An advantage of the nonlinear force displacement curve of the spring coupling is that it augments the self-stabilization of the movement. Because during the movement of the slave arm from its initial position into a target position, an active vibration compensation occurs which facilitates that the arm is at rest quickly when it reaches the target position.

In a preferred embodiment, two strands of the traction means run between the driving roller and the driven roller, where a spring coupling is incorporated into each of them. In this context, the strand is understood to be a section of a free and unsupported rope-like traction means.

In modified embodiments, the strand of a traction means can also have multiple spring couplings. In this context, either all or only one of the spring couplings can have a nonlinear force displacement curve, the characteristics of which are different, however.

It is moreover an advantage, if the spring coupling is positioned such that during the reeling-up of a rope-like traction means onto the driving roller, the spring coupling is either completely or even only partially still in the part of the rope which is not on the roller, so that it therefore does not change the characteristics of the force transmission section unintentionally as a result of the spring coupling.

In a modified embodiment, the spring coupling is integrated as part of the driving and/or driven roller and is not located in the strand of the rope-like traction means. In this context, one side of the spring coupling is connected to a rotation axis that is on the driving and/or the driven roller and unreels. The opposite end of the spring coupling is coupled to the traction means. The effects caused by the nonlinear spring coupling remain unchanged, since the spring coupling continues to be engaged as part of the force transmission section.

The spring coupling to be used as taught by the invention preferably has two spring elements to provide the nonlinear force displacement curve. In this context, the first spring element is a traditional spring, such as a tension spring, and the second spring element is a spring element with an increasing spring constant, such as an elastomeric strip. Both spring elements in the force transmission section are connected in parallel.

In a suitable embodiment, the second spring element is arranged longitudinally relative to the spring axis of the first spring element and runs in the cylindrical hollow space of the tension spring. In that context, the ends of the spring elements are linked to each other. Each of the two linked ends are connected with the rope-like traction means.

The force transmission between the driving roller and the driven roller is realized by means of the traction means, which preferably is a rope, consisting of synthetic fibers that are highly-resistant against tearing and abrasive wear (such as polyethylene fibers). The advantage therefore is that belt and chain drives which are equipped with a highly flexible traction means but not elastic rope-like traction means can be used in applications which are dangerous for humans, or which are inaccessible. And for applications in which an extremely low temperature range of approximately $-130°$ C. to $-195°$ C. (cryogenic range) must be maintained, for example, it is very important that the drive mechanisms remain fully functional and are not subjected to excessive wear.

The traction means can alternatively also be a toothed belt, a transmission belt, a chain, a metal rope, a rod, or suchlike.

The traction means can alternatively also be a toothed belt, a transmission belt, a chain, a metal cable, a rod, or likewise.

The driving rollers and the driven rollers can be designed as rope rollers, shafts, pulleys, or suchlike. In the simplest case, the rollers are supported on central rotation axes that are attached to a frame. But the support can also be specifically eccentric, in order to change the effective transmission ratio between the rollers during the rotation. A change in the transient response can also be obtained by shifting the force application point on which the traction means engages the respective roller relative to the rotation axis of the respective roller.

A modified embodiment of the antagonistic transmission mechanism has two rope-like traction means, wherein each fraction means is firmly attached to the driving and the driven roller, respectively.

In an embodiment that is modified once again, the ends of the rope-like traction means are firmly attached only to the driving roller. In this context, the driven roller guides the traction means, which is designed as a deflection roll here.

To construct a robotics unit or something of that kind, several drive systems as taught by the invention can be arranged in tandem. In this context, traction rope means can be guided via several deflection rolls, so that the motor drive can be arranged relatively far away from the actual working element, such as on a gripper.

The structural connection of spring coupling and traction means facilitates a larger transfer of moments on the driven side of the drive system. In this context, the individual spring mechanisms of an optimally assembled cascade are configured such that a "soft" stop is possible upon reaching the maximum specified deflection. The springs are sized so that they are only effective in the elastic range. Using spring mechanisms connected to each other produces nonlinear spring characteristics for the transfer of moments on the driven side. An advantage is having the possibility of generating the defined force and/or moment on the driven side or on the active element.

The force displacement curve can be adapted to the respective application depending upon the arrangement of the spring mechanisms that are connected to each other. In this context, this adaptation can also accomplish a non-symmetrical characteristic curve, as a result of which differences in characteristics result during a reciprocating motion.

In a further advantageous embodiment, the origin of the force displacement curve can be shifted by means of static or dynamic preloading on the strand, such as by adding a further roller or an electromagnet.

In a particularly preferred embodiment of the invention, the frame supporting the transfer mechanism is designed as a slave arm/swiveling arm, which is attached on one end as an articulated joint and has a transfer mechanism as taught by the invention. By the serial or parallel connection of n-drives, complex movement mechanisms can be realized in a n-dimensional space, such as in a handling device. By connecting additional drive systems, it is possible to influence the impact of the spring characteristics on the driven side. The advantage of the elasticity between the driving roller and the driven roller in such a complex system is also the passive resilience which occurs during a potential collision, as well as protecting the mechanical components during sudden retroactive effects. This achieves a high passive safety of the slave arm without using additional sensor technology. The interactive bracing of the robotic elements resulting from the drive system moreover facilitates an extremely lightweight construction according to the principle of the endoskeleton, which also results in a significant reduction of energy consumption.

In order to augment high precision accuracy, the driven roller has at least one sensor for detecting the position and/or the motion on the driven side.

By means of a fiber-optic encoder that consists of a timing disk and an optical waveguide arrangement, a high angular resolution is possible which is required to determine the angular position and angular velocity of the swiveling arm. In addition to detecting the angle/s, it is preferable if the sensor has a separate unit for zero point detection. These fiber-optic encoder systems have the advantage that they also maintain their functionality in the cryogenic range, mentioned earlier.

In a preferred application, the driven roller is coupled to a joint for movement of the swiveling arm. In this context, it is advantageous to integrate the sensor into the joint of the slave arm.

In order to control an arm movement free of vibrations, it is advantageous if the driving roller has a further sensor which detects and controls the states of motion of the slave arm for the correction process. If the sensor signals of the drive roller and the driven roller are interlinked, a particularly high accuracy can be achieved during positioning.

BRIEF DESCRIPTION OF THE DRAWINGS

Particularly preferred embodiments of the invention are presented in the figures, which will be explained in detail below, as follows:

FIGS. 5(a)-5(c) are schematic representations of the spring coupling with a nonlinear force displacement curve;

FIG. 7 is a side elevation of an embodiment of a slave arm with several drive systems in tandem.

DETAILED DESCRIPTION OF THE INVENTION

Figure 1:
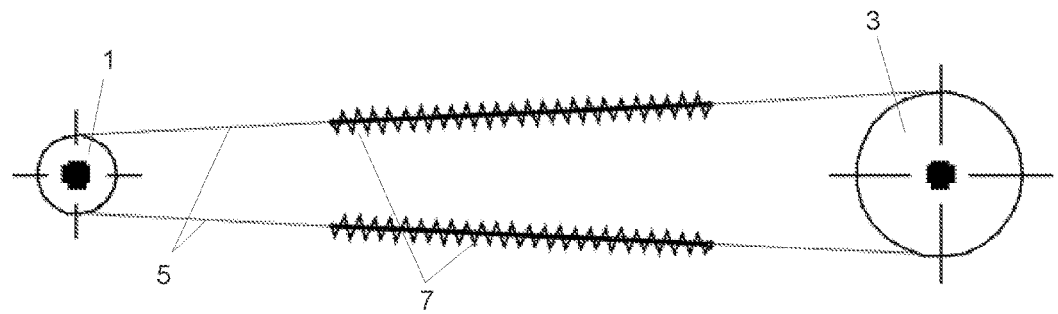
FIG. 1 is a schematic representation of a first embodiment of the transmission mechanism as taught by the invention with two spring couplings with a nonlinear force displacement curve.

FIG. 1 is a schematic representation of a first embodiment of the transmission mechanism as taught by the invention. The transmission mechanism has a driving roller 01 and a driven roller 03, where the rotation axes of both are supported on a frame (not shown). Two antagonistically operating rope-like traction means 05 are running for the force transmission between the driving roller 01 and the driven roller 03. The ends of the rope-like traction means 05 in the embodiment represented here are firmly attached to the driven roller 03 and the driving roller 01, in each case.

When the driving roller 01 starts rotating, the corresponding driven roller 03 also starts rotating as a result of the mechanical coupling produced by the traction means 05. A mechanical component (not shown) connected to the driven roller 03 or the traction means 05 will therefore also be set into motion (output motion). If the driving roller is rotated in the opposite direction, then the output motion is correspondingly also in the opposite direction. Depending on the mechanical guidance of the driven element, the connected mechanical component follows a fixed path of motion in two opposite directions.

A spring coupling 07 is inserted into each strand of the embodiment represented in FIG. 1. The spring coupling 07 together with the rope-like traction means 05 forms a force transmission section, which causes a nonlinear load displacement curve on the driven side. The nonlinear characteristic curve results because of the design of the spring coupling, an example of which is described further below with reference to FIG. 5. On the driven roller 03, a moment can be picked-off, which, depending on the rotation of the driving roller 01, is effective in two directions of a path of motion.

Figure 2:
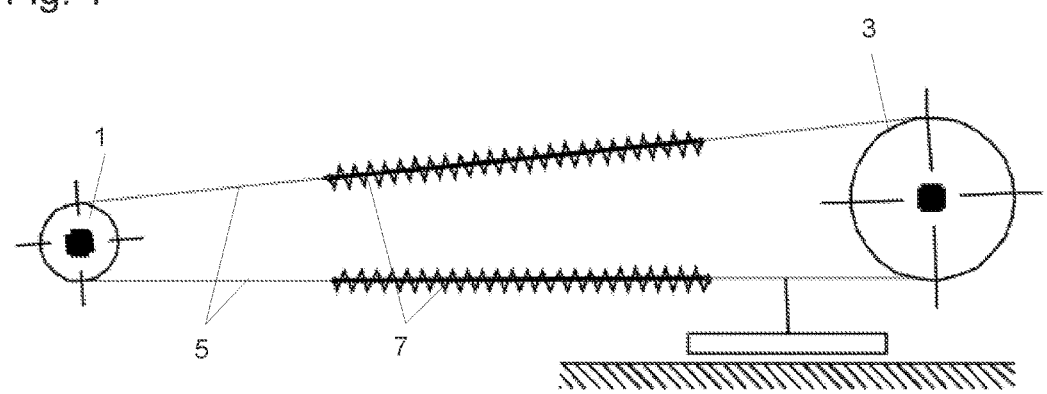
FIG. 2 is a schematic representation of a second embodiment of the transmission mechanism with an option for shifting the characteristic curve.

FIG. 2 represents a second embodiment of the drive system which has the essential elements of the previous embodiment. A particularity of this embodiment consists in that a pretension means 09 is provided with which the pretension of the spring couplings 07 is adjustable. By a linear displacement of the pretension means 09, for example, the springs of the spring couplings 07 are pretensioned with higher or lower potency. In this way, the characteristic curve of the force transmission section can be shifted relative to the relevant path (motion path of the strand).

Figure 3:
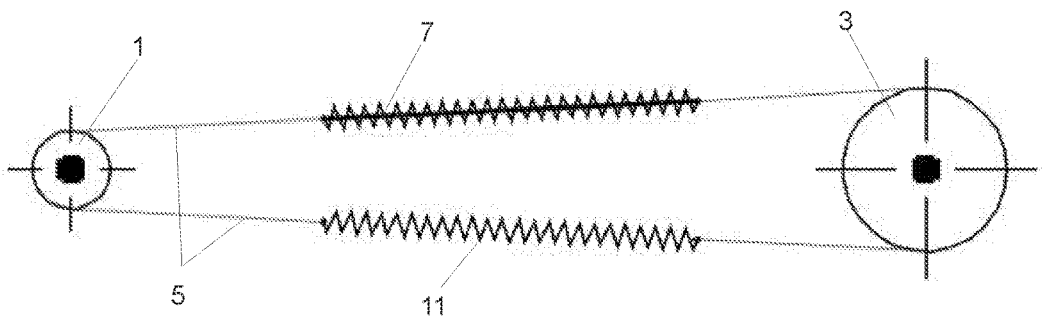
FIG. 3 is a schematic representation of a third embodiment of the transmission mechanism with a linear spring and a nonlinear spring coupling.

FIG. 3 represents a third embodiment of the transmission mechanism which has the essential elements of the embodiment from FIG. 1. The difference compared to FIG. 1 is that the antagonistically operating rope-like traction means 05 has a spring coupling 07 only in one strand. A traditional tension spring 11 with a linear load displacement curve is used in the second strand. The nonlinear load displacement curve of the transmission mechanism is therefore effective only if the section of the traction means containing the spring coupling 07 operates as the driving side. In an embodiment that is modified once again, the tension spring 11 can even be completely omitted. In all of these structural variants, the advantages accomplished by the invention are available only in one direction of rotation of the driven roller.

Figure 4:
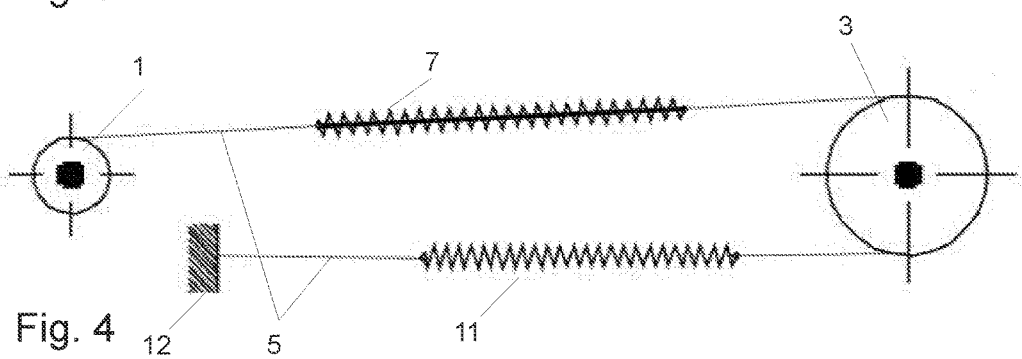
FIG. 4 is a schematic representation of a fourth embodiment of the transmission mechanism with a taut strand side against a fixed support.

FIG. 4 represents a fourth embodiment of the transmission mechanism which has the essential elements of the embodiment from FIG. 3. The difference compared to FIG. 3 is that the one end of the rope-like traction means 05 is firmly attached to the driving roller 01 and the second end is connected to a fixed support 12 on a housing or a frame, for example. The load moment that can be picked-off on the driven roller 03 has, in this case, also a nonlinear load displacement curve only in one direction of the path of motion, since the spring coupling 07 with the nonlinear spring constant is used only in one of the traction means sections which contacts the driven roller. From an abstract point of view, the traction means section between the driven roller 03 and the fixed support 12 could be omitted altogether. In that case, the tension spring 11 merely serves for resetting the driven roller when no tensile force is applied from the drive roller 01 via the traction means 05 and the spring coupling 07. But the transmission mechanism as taught by the invention is nevertheless realized, however, even if it is effective only in one direction of motion.

FIGS. 5(*a*)-5(*c*) show schematic detailed illustrations of the spring coupling 07, inserted into the rope-like traction means 05, in three phases of motion. The spring coupling 07 is inserted in the strand of the rope-like traction means 05 and includes two spring elements. A first spring element 13 is a traditional tension spring, for example, in the rope core of which a second spring element runs. In that context, the ends of the two spring elements are interlinked. The second spring element 15 has a spring constant which increases with increasing longitudinal extension, and is an elastomeric strip, for example. In the state shown in FIG. 5(*a*), only a low tensile force acts on the spring coupling 07, wherein the elastomeric strip 15 lies loosely in the only lightly tensioned tension spring 13. In this phase of motion, the spring coupling operates the same as a traditional tension spring with a linear characteristic curve. If a greater force is applied, this produces a greater stretch of the tension spring 13. At the same time, the elastomeric strip 15 in the tension spring 13 is tightened initially. With increasing force, the elastic elongation of the elastomeric strip 15 begins as the tension spring 13 elongates further, as shown in FIG. 5(*b*). The elastomeric strip 15 is configured such that, when reaching a maximum specified elongation, it enters a non-elastic range, before the tension spring 13 is overstretched. This state is illustrated in FIG. 5(*c*). Here, the elastomeric strip 15 acts like a non-elastic rope, so that high tensile forces can be transmitted essentially instantaneously from the driving roller to the driven roller.

Figure 6:
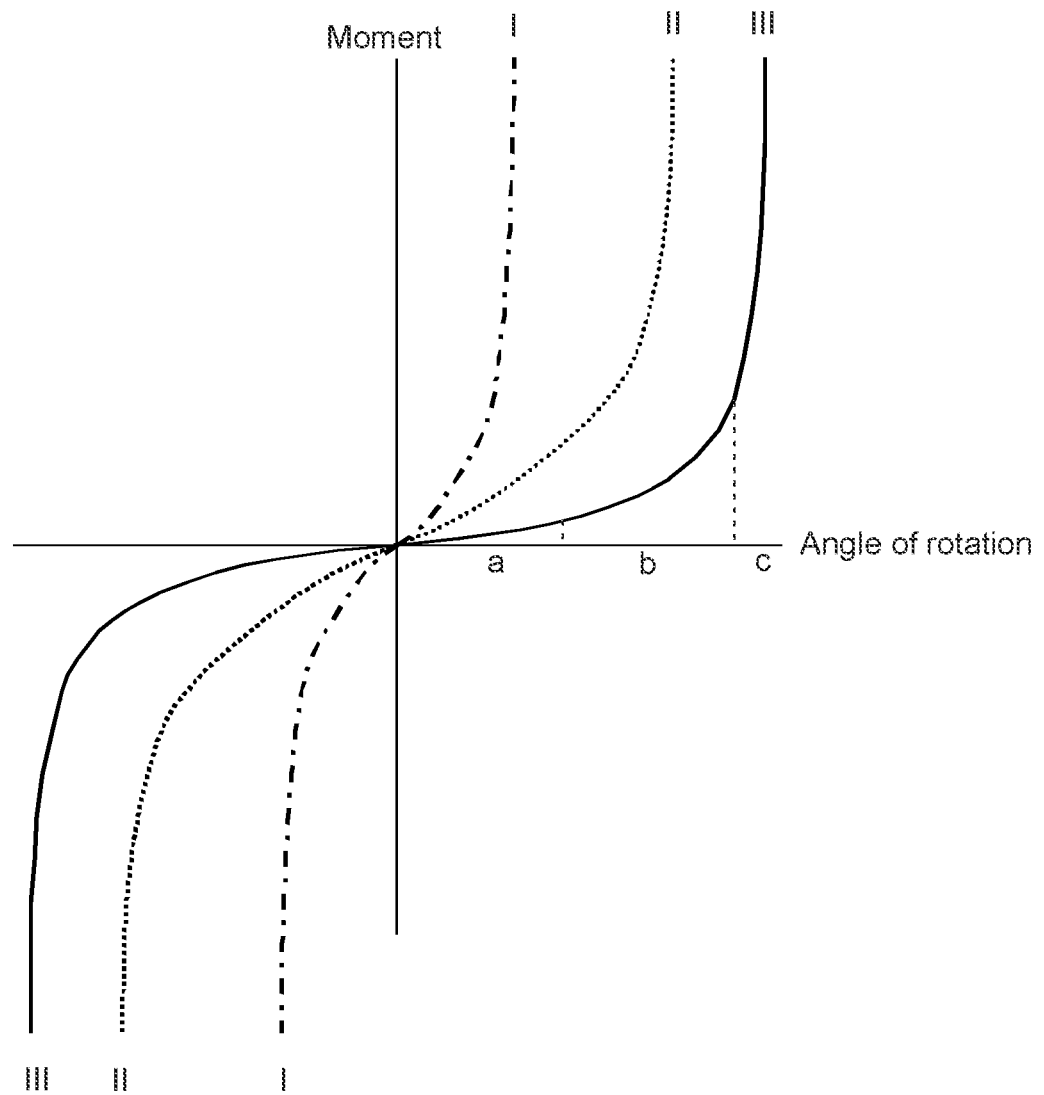
FIG. 6 are typical curves of force displacement and/or moment rotational angle characteristics, like those that are produced due to the use of the nonlinear spring coupling.

FIG. 6 shows typical curves of force displacement and/or moment rotational angle characteristics, like those that are produced when the described spring coupling 07 is used. The characteristic curves I, II and III symbolize different spring couplings. As explained above, the characteristic curve can be adjusted by structural measures both with respect to slope as well as with respect to the zero position. In addition, three sections a, b, and c, are marked on the characteristic curve III, which essentially correspond to the three phases in the sequence of motion, as they were described in connection with FIG. 5.

FIG. 7 illustrates a simplified side elevation of an embodiment of a multipart slave arm with multiple drive systems using the transmission mechanism as taught by the invention. The multipart slave arm, preferably a robot arm, has an articulated arm structure with four elastically coupled joints for column, shoulder, elbow, and for tilting the hand, so that a degree of freedom of F=4 can be realized. A traditional drive (not shown) makes it possible to rotate the column 16. A first drive system 17, designed as taught by the invention, is located at the base of the robot arm and includes a motor-driven first driving roller 01*a* (see FIGS. 1-4 for placement), a pivoted first driven roller 03*a*, and an antagonistically operating first rope-like traction means 05*a*, into each force transmission section of which spring couplings 07*a* are inserted. The first driven roller 03*a* supports a first swiveling arm 25 with articulated joints, which performs a swiveling motion when driven by the first transmission mechanism 17.

The first swiveling arm 25 supports a second transmission mechanism 27 designed as taught by the invention with a second driving roller 01*b*, a second driven roller 03*b*, a second traction rope 05*b*, and second spring couplings 07*b* which are inserted therein.

The second driving roller 01*b* is supported on a carrier plate 28. The second driven roller 03*b* forms a third joint, on which a second swiveling arm 37 is pivotally supported.

The carrier plate 28 moreover supports a third driving roller 01c, which belongs to a third transmission mechanism 35 as taught by the invention. The third driving roller 01c drives a deflection roll 31 via a traditional traction rope 36, said deflection roll being arranged on the pivot bearing of the second swiveling arm 37. Starting from the deflection roll 31, a third antagonistically operating rope-like traction means 05c with inserted third spring couplings 07c runs up to a third driven roller 03c. The second swiveling arm 37 has the third driven roller 03c on its end, which actuates a fourth joint 39.

A person skilled in the art can easily recognize that a large variety of positioning functions can be realized with the transmission mechanism as taught by the invention.

The invention claimed is:

1. A robot arm including a transmission mechanism for a drive system which acts in two directions with at least one traction means, which runs between a driving roller and a driven roller for power transmission, the traction means having at least two strands, wherein the traction means is a rope, wherein the transmission mechanism comprises:
    a frame that supports the driving roller and the driven roller, and
    a spring coupling with a nonlinear load displacement curve inserted in a force transmission section between the driving roller and the driven roller, the spring coupling configured such that stretch of the spring coupling beyond a predetermined elongation causes a nonlinear load, and
    such that the spring coupling is pretensioned in one of the at least two strands, the pretensioned strand constituting a loaded strand of the traction means, such that a minimum tension force is produced in a slack strand under all load conditions,
    and wherein the traction means further comprises a tension spring inserted in a different force transmission section between the driving roller and the driven roller, the tension spring having a linear load displacement curve,
    such that the nonlinear load displacement curve is effective only if the force transmission section having a spring coupling between the driving roller and the driven roller operates as the driving side, such that when the force transmission section having the spring coupling with the nonlinear load displacement curve operates as the driving side, then the spring coupling having the nonlinear load displacement curve is stretched beyond the predetermined elongation, resulting in the nonlinear load displacement curve being effective, and such that when the force transmission section having the linear load displacement curve operates as the driving side, then the spring coupling having the nonlinear load displacement curve is not stretched beyond the predetermined elongation, resulting in the spring coupling acting linearly.

2. The robot arm transmission mechanism of claim 1, wherein the traction means comprises two antagonistically operating traction means that run between the driving roller and the driven roller, wherein the spring coupling with a nonlinear load displacement curve is inserted respectively in at least one of the two traction means.

3. The robot arm transmission mechanism of claim 1, wherein the spring coupling is positioned in one of the at least two strands of the traction means, such that during a reeling-up of the traction means onto the driving roller or driven roller, the spring coupling is still in the part of the traction means that is not on the driving roller or driven roller, respectively.

4. A robot arm transmission mechanism including drive systems which act in two directions with at least a first traction means, which runs between a first driving roller and a first driven roller, and a second traction means, which runs between a second driving roller and a second driven roller, for power transmission, wherein each of the first and second traction means is a rope, wherein the transmission mechanism comprises:
    a first drive system, the first drive system having a proximal end coupled to a base and a distal end, and including:
        a first frame that supports the first driving roller and the first driven roller, and
        a first spring coupling with a nonlinear load displacement curve inserted in a first force transmission section of the first traction means between the first driving roller and the first driven roller supported by the first frame, and
        such that the first spring coupling is pretensioned in a loaded strand of the first traction means, such that a minimum tension force is produced in a slack strand of the first traction means under all load conditions; and
    a second drive system, the second drive system having a proximal end coupled to the distal end of the first drive system and configured to rotate about the distal end of the first drive system, and including:
        a second frame that supports the second driving roller and the second driven roller, and
        a second spring coupling with a nonlinear load displacement curve inserted in a second force transmission section of the second traction means between the second driving roller and the second driven roller supported by the second frame, and
        such that the second spring coupling is pretensioned in a loaded strand of the traction means, such that a minimum tension force is produced in a slack strand of the second traction means under all load conditions.

5. A transmission mechanism for a drive system which acts in two directions with at least one traction means, which runs between a driving roller and a driven roller for power transmission, wherein the traction means is a rope, wherein the transmission mechanism comprises:
    a frame that supports the driving roller and the driven roller, and
    a spring coupling with a nonlinear load displacement curve inserted in a force transmission section between the driving roller and the driven roller, the spring coupling configured such that stretch of the spring coupling beyond a predetermined elongation causes a nonlinear load, and
    such that the spring coupling is pretensioned in a loaded strand of the traction means, such that a minimum tension force is produced in a slack strand under all load conditions,
    and wherein the traction means further comprises a tension spring inserted in a different force transmission section between the driving roller and the driven roller, the tension spring having a linear load displacement curve,
    such that the nonlinear load displacement curve is effective only if the force transmission section having a spring coupling between the driving roller and the driven roller operates as the driving side, such that when the force transmission section having the spring coupling with the nonlinear load displacement curve operates as the driving side, then the spring coupling having the nonlinear load displacement curve is stretched beyond the predetermined elongation, resulting in the nonlinear load displacement curve being effective, and such that when the force transmission section having the linear load displacement curve operates as the driving side, then the spring coupling having the nonlinear load displacement curve is not stretched beyond the predetermined elongation, resulting in the spring coupling acting linearly.

* * * * *